US012811284B1

(12) United States Patent
Kiddle

(10) Patent No.: US 12,811,284 B1
(45) Date of Patent: Nov. 24, 2026

(54) INTERNAL SHAPING OF RADOME TIP FOR PRESERVATION OF ANTENNA GAIN

(71) Applicant: Honeywell Federal Manufacturing & Technologies, LLC, Kansas City, MO (US)

(72) Inventor: Daniel Scott Kiddle, Prairie Village, KS (US)

(73) Assignee: Honeywell Federal Manufacturing & Technologies, LLC, Kansas City, MO (US)

( * ) Notice: Subject to any disclaimer, the term of this patent is extended or adjusted under 35 U.S.C. 154(b) by 0 days.

(21) Appl. No.: 19/343,594

(22) Filed: Sep. 29, 2025

(51) Int. Cl.
*H01Q 1/42* (2006.01)
*H01Q 1/28* (2006.01)

(52) U.S. Cl.
CPC ............... *H01Q 1/42* (2013.01); *H01Q 1/281* (2013.01)

(58) Field of Classification Search
CPC ................................ H01Q 1/42; H01Q 1/281
See application file for complete search history.

(56) References Cited

U.S. PATENT DOCUMENTS

| | | | |
|---|---|---|---|
| 4,905,602 A | 3/1990 | Buckland | |
| 2012/0249357 A1 * | 10/2012 | Stratis | F41G 7/2293 342/54 |
| 2020/0173761 A1 | 6/2020 | Vabnick | |

FOREIGN PATENT DOCUMENTS

| | | |
|---|---|---|
| DE | 102023125533 A1 | 3/2025 |
| EP | 0047684 A1 | 3/1982 |

OTHER PUBLICATIONS

G. V. R. K. Rao, et al, "Design and Development of Tapered Ceramic radome with Metal Tip," 2019 IEEE Indian Conference on Antennas and Propogation (InCAP), Ahmedabad, India, 2019, pp. 1-4, doi: 10.1109/InCAP47789.2019.9134623.

* cited by examiner

*Primary Examiner* — Graham P Smith
(74) *Attorney, Agent, or Firm* — Erise IP, P.A.

(57) ABSTRACT

A radome assembly may include a radome body having an opening and a threaded interface portion. The radome body may house an antenna. The radome assembly may further include a radome tip formed at least in part from a metallic material and coupled to the opening of the radome body. The radome tip may comprise a front portion, a rear portion axially symmetric with the front portion about a vertical axis of the radome tip, and a threaded portion formed on the rear portion, where the threaded portion is configured to engage with the threaded interface portion of the radome body to couple the radome tip to the radome body. The antenna may be configured to transmit one or more signals that propagate along a surface of the rear portion of the radome tip. The rear portion of the radome tip may comprise a conical or curved surface.

20 Claims, 6 Drawing Sheets

INTERNAL SHAPING OF RADOME TIP FOR PRESERVATION OF ANTENNA GAIN

STATEMENT OF GOVERNMENT SUPPORT

This invention was made with government support under contract number DE-NA-0002839 awarded by the United States Department of Energy/National Nuclear Security Administration. The government has certain rights in the invention.

BACKGROUND

1. Field

Embodiments of the present disclosure relate to radome assemblies for aerodynamic vehicles. More specifically, embodiments of the present disclosure relate to radome tips for radome assemblies that improve signal integrity.

2. Related Art

Traditionally, there is a preference for radar and wireless communication systems, such as those employed in aerospace and defense applications, to have unimpeded electromagnetic (EM) transmission and reception. Ideally, such energy exchange would occur directly through free space. However, practical system design frequently necessitates housing antennas or communication modules within environmental or aerodynamic enclosures, such as radomes, nose cones, or other protective structures—especially in systems integrated into aircraft, missiles, or other high-velocity platforms.

Traditionally, these aerodynamic enclosures are constructed from materials that exhibit favorable radio frequency (RF) transparency characteristics, such as ceramics or engineered plastics. These materials offer a desirable combination of structural resilience and relatively low EM interference. For example, ceramics have been used in missile nose cones due to their mechanical durability and resistance to environmental stress, while still allowing a significant degree of RF transmission.

However, metallic components are sometimes incorporated at the forward-most point to address the harsh aerodynamic and mechanical loads present at the leading tip of such aerodynamic enclosures. While metals are effective at withstanding mechanical impact and erosion, they also exhibit high reflectivity to EM waves. As a result, these metallic tips can disrupt the propagation of RF signals by reflecting, deflecting, or diffracting the EM waves, particularly at specific frequencies and incidence angles. This disruption may degrade the performance of onboard antenna systems, such as when signals are transmitted or received along a boresight direction of the aerodynamic enclosure.

Further, the geometry of the metallic tip plays a role in determining the severity of these RF signal disruptions. For example, a traditional flat-back metallic tip can act similarly to a reflective plane or mirror, which may redirect incident EM energy back toward the originating antenna. This back-reflection of EM waves can diminish receiver sensitivity and may further present a risk to other sensitive electronic components. For example, the reduction in receiver sensitivity may result from interference between the reflected signal and the desired incident signal, which can elevate the effective noise floor and reduce the receiver's ability to detect signals, such as low-amplitude or weak signals. Such interference may also impair signal discrimination and adversely affect overall system performance.

These challenges associated with EM interference from metal-tipped aerodynamic enclosures highlight the need for innovative tip design approaches to support improved signal integrity, system sensitivity, and operational range without compromising structural integrity.

SUMMARY

Embodiments of the present disclosure solve the above-mentioned problems by providing a radome tip, comprising a front portion and a rear portion, operable to improve the signal integrity of an aerodynamic vehicle comprising a radome assembly.

In some embodiments, the techniques described herein relate to a radome assembly, including: a radome body, including: an opening; and a first interface portion; and a radome tip formed at least in part from a metallic material and coupled to the opening of the radome body, the radome tip including: a front portion; a rear portion at least partially located within the radome body, wherein the rear portion is shaped to reduce scattering of electromagnetic waves propagating along the radome tip; and a second interface portion formed on the rear portion, wherein the first interface portion and the second interface portion are configured to engage with each other to couple the radome tip to the radome body.

In some embodiments, the techniques described herein relate to an aerodynamic vehicle, including: an aerodynamic body; and a radome assembly coupled to the aerodynamic body, the radome assembly including: a radome body housing an antenna; and a radome tip coupled to the radome body, the radome tip including: a substantially conical front portion; and a substantially conical rear portion, wherein the antenna is configured to transmit one or more signals that propagate along a surface of the substantially conical rear portion.

In some embodiments, the techniques described herein relate to a method of forming a radome assembly, including: forming a radome tip, the radome tip including: a front portion; and a rear portion axially symmetric to the front portion about a first axis of the radome tip; providing a radome body having an opening configured to receive the radome tip; and coupling the radome tip to the radome body.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present disclosure will be apparent from the following detailed description of the embodiments and the accompanying drawing figures.

BRIEF DESCRIPTION OF THE DRAWING FIGURES

Embodiments of the present disclosure are described in detail below with reference to the attached drawing figures, wherein.

Figure 1:
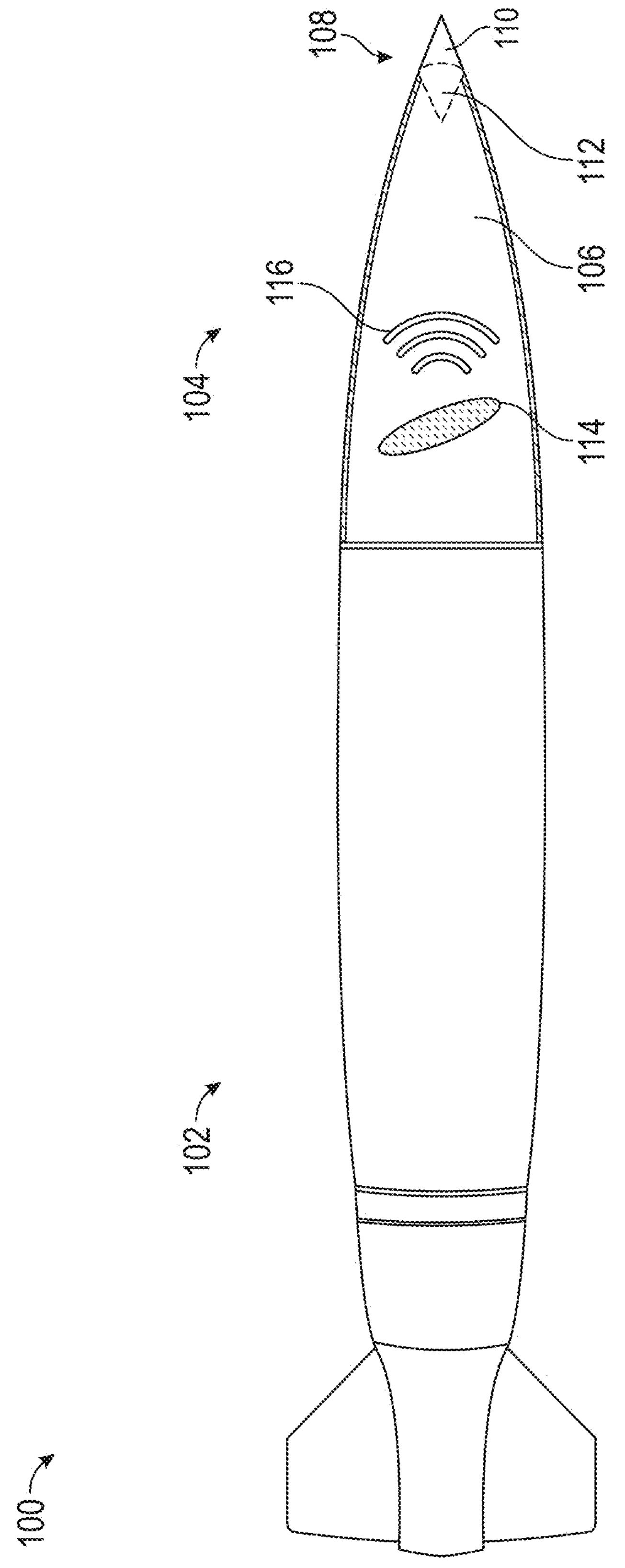
FIG. 1 illustrates an exemplary aerodynamic vehicle comprising a radome assembly in accordance with embodiments disclosed herein.

The drawing figures do not limit the present disclosure to the specific embodiments disclosed and described herein. The drawings are not necessarily to scale; emphasis instead being placed upon clearly illustrating the principles of the present disclosure.

DETAILED DESCRIPTION

The following detailed description references the accompanying drawings that illustrate specific embodiments in which the present disclosure can be practiced. The embodiments are intended to describe aspects of the present disclosure in sufficient detail to enable those skilled in the art to practice the present disclosure. Other embodiments can be utilized, and changes can be made without departing from the scope of the present disclosure. The following detailed description is, therefore, not to be taken in a limiting sense. The scope of the present disclosure is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc., described in one embodiment may also be included in other embodiments, but is not necessarily included. Thus, the technology can include a variety of combinations and/or integrations of the embodiments described herein.

Embodiments of the present disclosure provide a radome tip, comprising a front portion and a rear portion, operable to improve the signal integrity of an aerodynamic vehicle comprising a radome assembly. In some embodiments, the radome tip may be axially symmetric. The front portion and/or the rear portion of the radome tip may comprise a signal-receiving surface, such as a curved or conical surface. In some embodiments, the radome assembly houses an antenna such that one or more signals transmitted or received by the antenna propagate along or through the signal-receiving surface of the rear portion of the radome tip. Embodiments of the present disclosure promote the transmission of signals along or near the signal-receiving surface of the radome tip. For example, by selectively shaping and providing a radome tip with a rear portion, such as a rear portion of the radome tip protruding into an interior volume of a radome body, the interface between the surface of the rear portion and the transmitted signals provide a more favorable path for the signals to propagate efficiently towards a target (e.g., receiver), minimizing signal distortion, reflection, and/or scattering during operation. Further, embodiments of the present disclosure promote this type of favorable transmission of signals using a metallic radome tip. For instance, the radome assembly in operation may promote this improved signal transmission while utilizing a radome tip composed of a metallic material that shields interior components from external environmental factors, such as aerodynamic heating, debris impact, or EM interference.

FIG. 1 illustrates an exemplary aerodynamic vehicle 100 in accordance with the embodiments disclosed herein. Aerodynamic vehicle 100 may include an aerodynamic body 102 and a radome assembly 104. In some embodiments, aerodynamic body 102 and radome assembly 104 may be a continuous structure. In other embodiments, aerodynamic body 102 and radome assembly 104 may be separate components configured to be fixedly or removably coupled to one another.

Aerodynamic vehicle 100 may include, but is not limited to, a missile, guided munition, aircraft, unmanned aerial vehicle (UAV), projectile, or any other airframe or flight body subject to aerodynamic flow and benefitting from EM transparency at a leading edge or nose portion. For example, aerodynamic vehicle 100 may be a radar-guided missile, in which case the radome assembly 104 may be configured to permit the transmission and reception of radar signals with minimal attenuation or distortion. As another example, aerodynamic vehicle 100 may be part of a military or commercial aerospace vehicle, such as a jet, including crewed or uncrewed aircraft platforms that may use nose-mounted sensors or communication systems. In some embodiments, aerodynamic vehicle 100 may be designed for subsonic, supersonic, or hypersonic operation, and may incorporate the radome assembly 104 for purposes of radar transmission, communication, navigation, or sensing. The configuration of aerodynamic body 102 and radome assembly 104 may vary based on the vehicle type, intended function, or environmental conditions. In some embodiments, radome assembly 104 may also be shaped to exhibit hydrodynamic characteristics, enabling efficient movement through liquid environments or supporting applications where aerodynamic vehicle 100 transitions between air and water. Aerodynamic body 102 may be the body portion of any aerodynamic vehicle 100 described herein, including but not limited to a missile body or an aircraft body.

In some embodiments, radome assembly 104 may comprise a radome body 106 and a radome tip 108. Radome tip 108 may include a front portion 110 and a rear portion 112, which may together define the external and internal profile of radome tip 108. In some embodiments, front portion 110 may serve as the leading aerodynamic surface of aerodynamic vehicle 100. In some embodiments, rear portion 112 may be a backward protrusion extending into an interior volume 121 of radome body 106. Radome body 106 may house various internal components, including an antenna 114 configured to transmit and/or receive signals 116 (e.g., EM signals). In some embodiments, antenna 114 may be positioned within radome body 106 and relative to radome tip 108 to direct signals 116 through or along a portion of radome tip 108, such as along a surface of rear portion 112. The various components of radome assembly 104 may be configured to operate together as a structurally integrated and functional subassembly of aerodynamic vehicle 100.

Figure 2A:
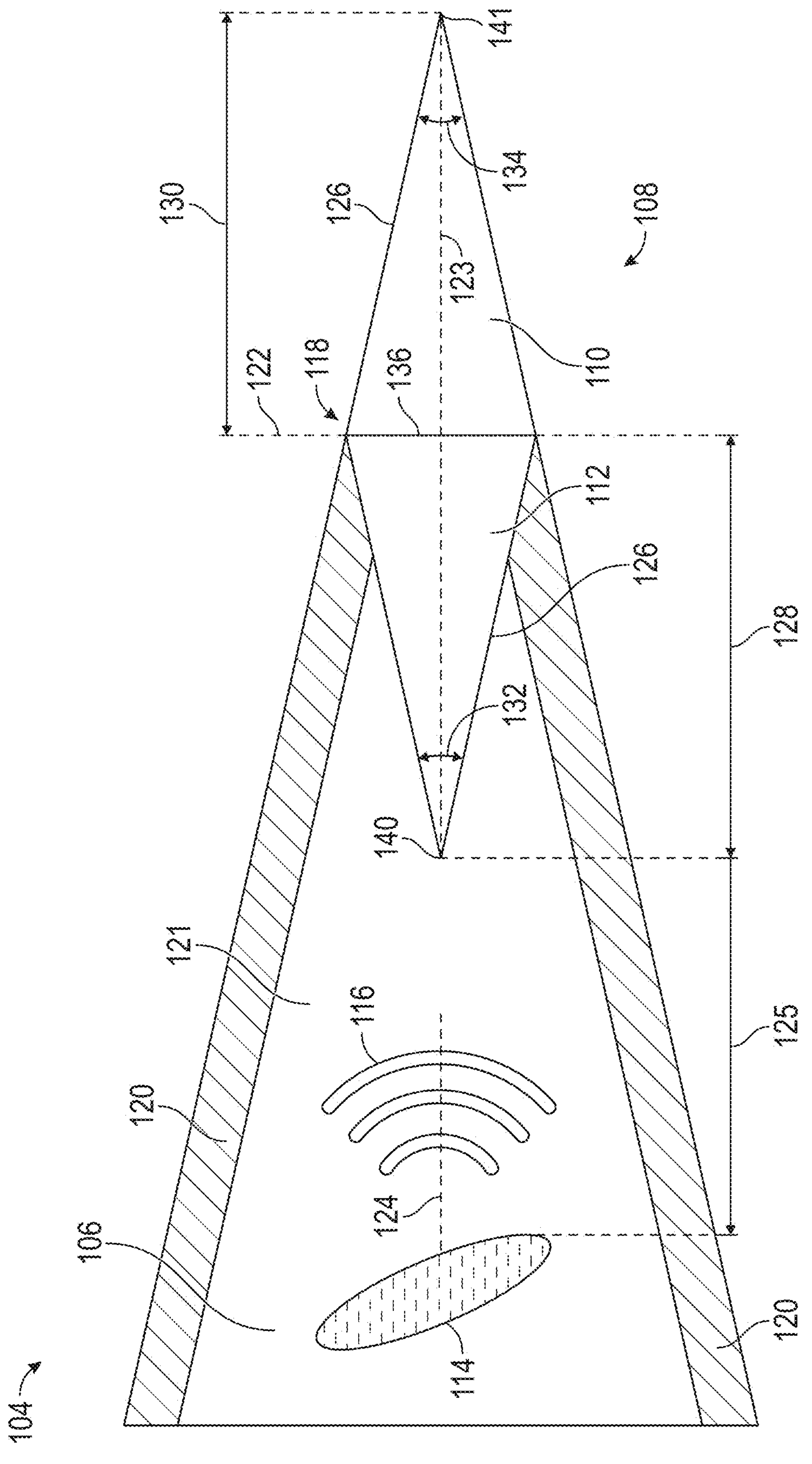
FIG. 2A illustrates an exemplary radome assembly comprising a radome tip in accordance with embodiments disclosed herein.

FIG. 2A illustrates an exemplary radome assembly 104 comprising radome body 106 and radome tip 108 in accordance with the embodiments disclosed herein. In some embodiments, radome body 106 may have a generally tapered or aerodynamic shape configured to minimize drag during flight and/or support structural and EM integration with the adjacent aerodynamic body 102. In some embodiments, the radome body 106 may be conical, ogival, elliptical, hemispherical, parabolic, or a multi-radius profile, or may include compound curves that blend multiple geometric features to achieve a desired aerodynamic and EM performance. However, it is appreciated that other geometries may be used based on system-level design considerations of aerodynamic vehicle 100, such as operating speed or sensor configuration.

In some embodiments, radome body 106 may include one or more boundary layers 120. Boundary layers 120 may be composed of different materials such as composites, ceramics, or dielectrics. In some embodiments, the composition of boundary layers 120 may enhance the structural integrity of radome assembly 104, reduce thermal or mechanical stresses of radome assembly 104, and/or protect signal integrity of antenna 114 from external environmental factors, including aerodynamic heating, debris impact, and EM interference.

The thickness and EM properties of each boundary layer 120 may be tailored to the operating frequency range of signals 116, such that boundary layer 120 itself does not introduce excessive attenuation, scattering, or reflection of signals 116. For example, boundary layers 120 may function as a frequency-selective surface, influencing how signals 116 pass through or along radome assembly 104.

In some embodiments, interior volume 121 may be a sealed region defined by radome body 106 and radome tip 108. In some embodiments, interior volume 121 may be air-filled. However, in some embodiments, interior volume 121 may be filled with a material having EM properties matched to those of boundary layer 120 to reduce the number of dielectric transitions, or general boundary transitions, signals 116 must cross. Minimizing the number of boundary transitions may help reduce unwanted internal reflections and maintain a clean signal path from antenna 114. Further, interior volume 121 may include additional elements, such as a conductive lead for lightning protection.

In some embodiments, the placement and orientation of antenna 114 within radome body 106 may be selected based on various structural and EM factors, including the thickness and curvature of boundary layers 120 and the shape and size of interior volume 121. These features of boundary layers 120 and interior volume 121 may influence how signals 116 propagate relative to radome tip 108 and affect performance parameters such as signal strength, directionality, and reflection. For example, antenna 114 may be positioned at a location that minimizes the exposure of antenna 114 to impedance mismatches, internal reflections, or signal distortion caused by boundary transitions or curved surfaces. The specific geometry of radome tip 108 and the surrounding volume of radome body 106 may guide decisions on how far forward or rearward antenna 114 is mounted within, or otherwise disposed within, radome body 106. The specific geometry of radome tip 108 and the surrounding volume of radome body 106 may also guide decisions on how antenna 114 is oriented relative to horizontal axis 123.

In some embodiments, antenna 114 may be oriented along a boresight axis 124 of antenna 114 such that signals 116 may be transmitted towards radome tip 108. For example, signals 116 transmitted from antenna 114 may propagate along or through the surface of radome tip 108. For instance, signals 116 may propagate along or through the surface of rear portion 112 and/or front portion 110. The boresight axis 124 of antenna 114 may refer to the direction in which antenna 114 is pointed, representing the primary axis of signal transmission or signal reception of antenna 114. In some embodiments, the boresight gain of antenna 114 may be preserved and/or enhanced by radome tip 108 disclosed herein. Boresight gain, as used herein, refers to signal strength amplification along boresight axis 124 of antenna 114, taking into account both the directivity and impedance matching of antenna 114. For example, radome tip 108 may reduce degradation of signal transmissions typically introduced by suboptimal radome geometries with, for example, a flat back tip design. For instance, shaping rear portion 112 of radome tip 108 to minimize scattering and internal reflection of EM waves (e.g., wavefronts) may help preserve the intended EM performance of antenna 114, such as in directional systems such as radar applications.

In some embodiments, antenna 114 may exhibit a boresight gain of approximately 10 dBi to 25 dBi, or higher, depending on the design of radome assembly 104 and the intended frequency band. The degree to which the boresight gain is preserved or enhanced in operation may depend on the ability of radome assembly 104 to maintain proper impedance matching and minimize distortion of the EM waves. For example, a radome assembly 104 with poor impedance characteristics may reduce the boresight gain despite preserving directivity, while a radome assembly 104 that introduces refraction or phase distortion may degrade directivity while maintaining good impedance matching.

Directivity, as used herein, refers to how well focused the radiated energy from the EM waves is in a particular direction. In some embodiments, radome tip 108 may be designed to preserve the directivity of antenna 114 by maintaining the shape and orientation of transmitted or received EM waves. Boresight gain, on the other hand, accounts for both directivity and efficiency, including impedance matching and material losses. While radome tip 108 disclosed herein may help preserve and/or enhance the boresight gain, in some embodiments, the primary function of radome tip 108 may be to minimize beam distortion and maintain the directivity of antenna 114.

In some embodiments, a signal path clearance distance 125 may be defined between antenna 114 and the rearmost portion 140 of radome tip 108. Signal path clearance distance 125 may represent the minimum spacing between the radiating face of antenna 114 and radome tip 108. Signal path clearance distance 125 may vary depending on the size, shape, and intended performance of radome assembly 104. For example, signal path clearance distance 125 may be relatively short to support compact designs. In contrast, in other embodiments, signal path clearance distance 125 may be extended to reduce signal interference, accommodate beam shaping, or align with the focal characteristics of a curved or parabolic surface of radome tip 108.

In some embodiments, radome body 106 may comprise an opening 118. For example, radome body 106 may comprise a forward-facing opening 118, near the nose end of radome body 106, configured to receive and retain radome tip 108. For instance, radome tip 108 may be fixedly or removably coupled to radome body 106. In some embodiments, radome body 106 and radome tip 108 may be formed as a single, continuous or monolithic structure, such that no discrete opening 118 is present between radome body 106 and radome tip 108. In some embodiments, aerodynamic body 102 and radome body 106 may be formed as a continuous or monolithic structure, while still comprising opening 118 configured to receive and retain radome tip 108. In some embodiments, rear portion 112 of radome tip 108 may be integrally formed with radome body 106 as a single, continuous, or monolithic structure, while front portion 110 of radome tip 108 may be a separate component that is configured to be subsequently coupled to rear portion 112 and/or directly to radome body 106.

In some embodiments, radome tip 108 may be composed partially or entirely of a metallic material, such as aluminum, titanium, or stainless steel, and/or a ceramic material, such as alumina, silicon carbide, or zirconia. Other suitable materials may include composite structures, metal-coated dielectrics, or high-performance polymers selected for their mechanical strength, thermal resistance, and EM properties. In some embodiments, front portion 110 may be formed of different materials than rear portion 112, allowing for optimization of aerodynamic durability at the leading edge of front portion 112 while tailoring the EM behavior at the rearward interface of rear portion 112 with antenna 114.

In some embodiments, radome tip 108 may be axially symmetric about a vertical axis 122 of radome tip 108, such that the geometry of radome tip 108 is rotationally uniform around vertical axis 122. For example, front portion 110 may mirror rear portion 112 about vertical axis 122. In some embodiments, horizontal axis 123 may represent the central longitudinal axis of the radome tip 108. In some embodiments, horizontal axis 123 may also be aligned, or substantially aligned, with the central longitudinal axis of radome body 106 and aerodynamic vehicle 100. This axial symmetry may facilitate predictable aerodynamic performance and ensure consistent interaction of signals 116, such as when boresight axis 124 of antenna 114 is centered or aligned along horizontal axis 123 of radome tip 108.

In some embodiments, radome tip 108 may not be axially symmetric about vertical axis 122 (i.e., it may be axially asymmetric). For example, a first horizontal length 128 of rear portion 112 may be different than a second horizontal length 130 of front portion 110. In some embodiments, rear portion 112 may extend a shorter horizontal length 128 from vertical axis 122 than front portion 110. For example, rear portion 112 may comprise a shorter conical or curved section primarily optimized for signal propagation, while front portion 110 may extend farther forward, or be more conical in shape, to provide aerodynamic shaping or structural impact resistance. In other embodiments, first horizontal length 128 of rear portion 112 may be a shorter length from vertical axis 122 than second horizontal length 130 of front portion 110 to accommodate internal components, such as antennas 114 and/or other electrical components.

In some embodiments, base length 136 of radome tip 108 may be of any suitable dimension and need not extend fully to the outer edge of radome body 106. In some embodiments, base length 136 may be aligned with vertical axis 122 of radome tip 108 and defined as the span across the base of front portion 110 and/or rear portion 112 that interfaces with the surrounding structure of radome body 106. In some embodiments, base length 136 of rear portion 112 may terminate within an interior region of radome body 106, while base length 136 of front portion 110 may extend partially or fully beyond the outer edges of the forward face of radome body 106. In some embodiments, base length 136 of front portion 110 may be different than base length 136 of rear portion 112, providing further design freedom to accommodate distinct apex angles, materials, or assembly constraints between front portion 110 and rear portion 112 of radome tip 108. In some embodiments, rear portion 112 may be partially, substantially, or entirely located within radome body 106.

In some embodiments, front portion 110 and/or rear portion 112 may be shaped to reduce scattering of EM waves such that the fidelity of the EM waves is maintained, regardless of whether the EM waves are flowing through or along front portion 110 or rear portion 112. For example, in some embodiments, rear portion 112 of radome tip 108 may include a conical surface 126 configured to influence the propagation of signals 116 transmitted by antenna 114. The conical geometry of conical surface 126 may be selected to promote the transmission of signals along or near the surface of rear portion 112, such as through surface wave propagation, leaky wave coupling, or controlled refraction. By shaping rear portion 112 as conical surface 126, the interface between signals 116 and radome tip 108 can provide a more favorable path for signals 116 to propagate efficiently, minimizing signal distortion, reflection, and/or scattering.

In some embodiments, rear portion 112 of radome tip 108 may include a conical surface 126 with a first apex angle 132, and front portion 110 may also include a conical surface 126 with a second apex angle 134. The "apex angle" of a conical surface discussed herein refers to the included angle between the sloped sides (e.g., sides of conical surface 126) of front portion 110 and/or rear portion 112 measured at the respective tip (apex) of front portion 110 and/or rear portion 112. These apex angles may be selected independently to satisfy various design requirements, including aerodynamic shaping, signal propagation behavior, structural efficiency, or manufacturability. The transition between conical surfaces 126 of front portion 110 and rear portion 112 may be smooth, stepped, or blended.

First horizontal length 128 and second horizontal length 130 may have any length for accommodating the desired aerodynamic shape, internal volume requirements, or signal transmission path, and may be independently selected to correspond with different first apex angles 132 and second apex angles 134, respectively. For example, a longer horizontal length may be paired with a narrower apex angle to form a slender conical profile, while a shorter horizontal length may be used with a broader apex angle to create a more compact or blunted shape.

First apex angle 132 and second apex angle 134 may each fall within different ranges, depending on the desired performance of aerodynamic vehicle 100. In some embodiments, the apex angle may range from about 5 to 160 degrees, encompassing both sharp and blunt tip configurations. For instance, a slender aerodynamic tip may have an apex angle of 30 degrees, corresponding to a half-angle of 15 degrees measured from horizontal axis 123 to a side of conical surface 126. In some embodiments, apex angles for front portion 110 may be within subranges of 5 to 10 degrees, 10 to 30 degrees, 30 to 60 degrees, or 60 to 90 degrees, while apex angles for rear portion 112 may be within subranges of 40 to 60 degrees, 60 to 80 degrees, 80 to 100 degrees, 100 to 120 degrees, 120 to 140 degrees, or 140 to 160 degrees. Apex angles of front portion 110 and/or rear portion 112 may be within any of the subranges previously disclosed herein. Broader or blunter apex angles (e.g., 120 to 160 degrees) may be used in applications where lower radar cross-section or improved signal spreading is desired, while narrower apex angles (e.g., 5 to 45 degrees) may enhance aerodynamic piercing characteristics. Different combinations of first apex angles 132 and second apex angles 134 may be selected to balance aerodynamic and signal transmission performance across different portions of radome tip 108.

In some embodiments, front portion 110 may have a curved surface portion. For example, forward-most portion 141 of radome tip 108 may be formed as a spherical cap or dome, having a radius of curvature that varies based on performance requirements. For example, forward-most portion 141 of front portion 110 may have a radius of curvature of approximately 1 millimeter (mm) to 5 mm, 5 mm to 10 mm, 10 mm to 20 mm, 20 mm to 50 mm, 5 centimeters (cm) to 10 cm, 10 cm to 20 cm, 20 cm to 50 cm, 50 cm to 100 cm, 100 cm to 500 cm, or greater. In some embodiments, the curved or spherical geometry of forward-most portion 141 may transition smoothly from the conical geometry of conical surface 126 of front portion 110 and may be further centered along horizontal axis 123.

It should be understood that any numerical range recited herein may include the bounds of the range and all sub-ranges subsumed therein. For example, a range of "20 to 160 degrees" may include any sub-ranges between and including the minimum value of 20 degrees and the maximum value of 160 degrees. For instance, the range of "20 to 160 degrees" may include all sub-ranges beginning with a minimum value equal to or greater than 20 degrees and ending with a maximum value equal to or less than 160 degrees, and all sub-ranges in between, e.g., 30 to 150 degrees, 45 to 120 degrees, 60 to 90 degrees, 25 to 75 degrees, 35 to 80 degrees, 50 to 70 degrees, or 40 to 55 degrees.

Figure 2C:
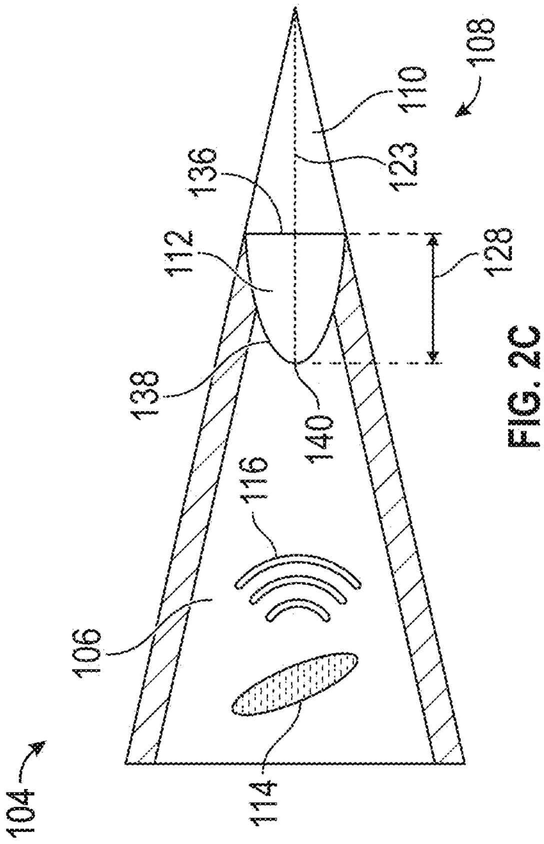
FIG. 2C illustrates an exemplary radome assembly comprising a radome tip in accordance with embodiments disclosed herein.
Figure 2B:
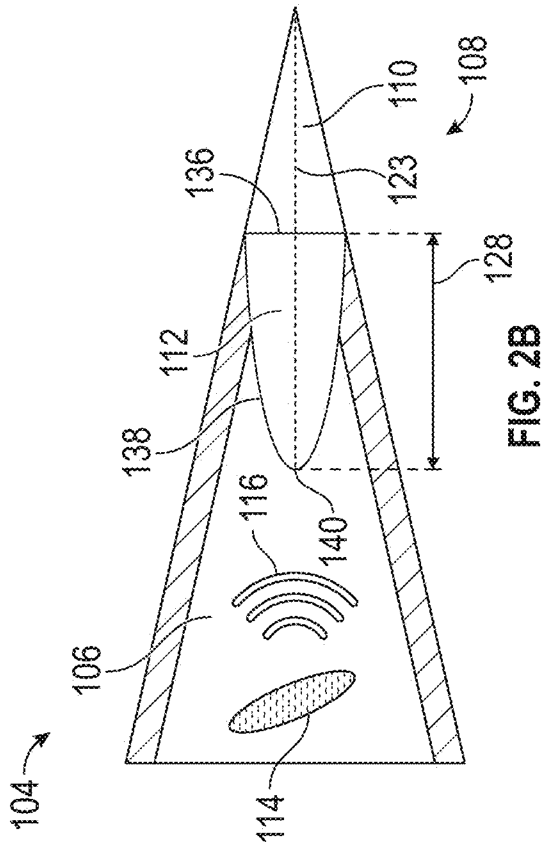
FIG. 2B illustrates an exemplary radome assembly comprising a radome tip in accordance with embodiments disclosed herein.
Figure 2D:
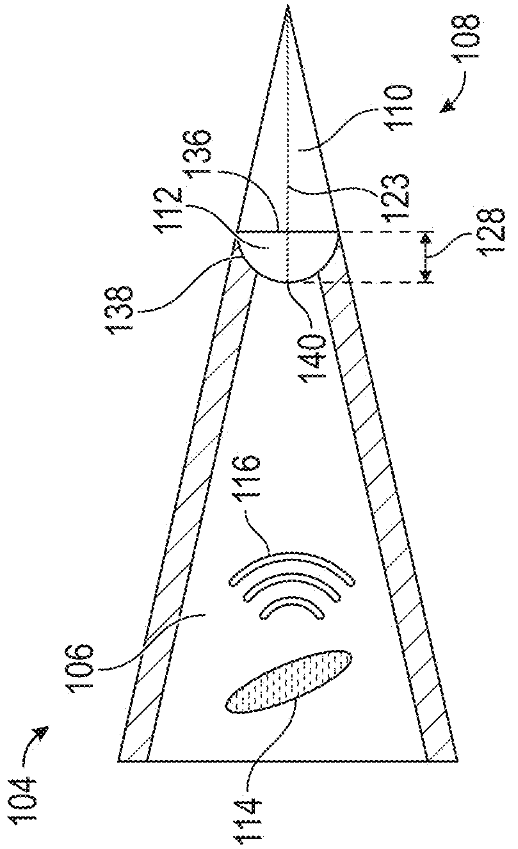
FIG. 2D illustrates an exemplary radome assembly comprising a radome tip in accordance with embodiments disclosed herein.

FIGS. 2B-2D generally illustrate an exemplary radome assembly 104 comprising alternative embodiments of radome tip 108 in accordance with embodiments disclosed herein. The radome assemblies illustrated in FIGS. 2B through 2D may include, but are not limited to, structural and functional features similar to those of radome assembly 104 depicted in FIG. 2A. These may include similar configurations of radome body 106, radome tip 108, and their respective features such as front portion 110, rear portion 112, opening 118, boundary layers 120, internal volume 121, vertical axis 122, horizontal axis 123, boresight axis 124, conical surface 126, first horizontal length 128, second horizontal length 130, first apex angle 132, second apex angle 134, and base length 136. While each illustrated embodiment may differ in geometry or curvature, they may share common design principles relating to aerodynamic shaping, signal transmission, and antenna integration, as described above.

As depicted in FIGS. 2B-2D, in some embodiments, rear portion 112 may define a curved (e.g., arcuate, parabolic, hemispherical, or multi-radius curve) surface 138 that is symmetric relative to horizontal axis 123. First horizontal length 128 of rear portion 112, measured along horizontal axis 123 from base length 136 to the rearmost portion 140 of rear portion 112, may vary based on the curvature and functional requirements of radome tip 108. In some embodiments, curved surface 138 of rear portion 112 may define a symmetric parabolic surface relative to horizontal axis 123. The parabolic shape may have varying focal lengths and axis-of-symmetry dimensions, depending on the desired EM or aerodynamic characteristics of radome tip 108.

In some embodiments, the shape and size of rear portion 112 and/or front portion 110 may be selected or adjusted based on the operating frequency of the signal transmission and/or reception by antenna 114. For example, a rear portion 112 comprising a longer base length 136 (e.g., width perpendicular to the longitudinal axis) and a shorter first horizontal length 128 (e.g., axial length along the longitudinal axis) may be desirable for lower-frequency applications. Conversely, a rear portion 112 comprising a shorter base length 136 combined with a longer first horizontal length 128 may be suitable for higher-frequency operation. The axial ratio of first horizontal length 128 to base length 136 may influence frequency-specific performance of radome tip 108. For example, a higher axial ratio (longer and narrower shape) may support preservation of signal integrity at higher frequencies by reducing scattering and impedance mismatch. These dimensional adjustments may allow radome tip 108 to be tuned for improved EM performance across various frequency bands.

Figure 3:
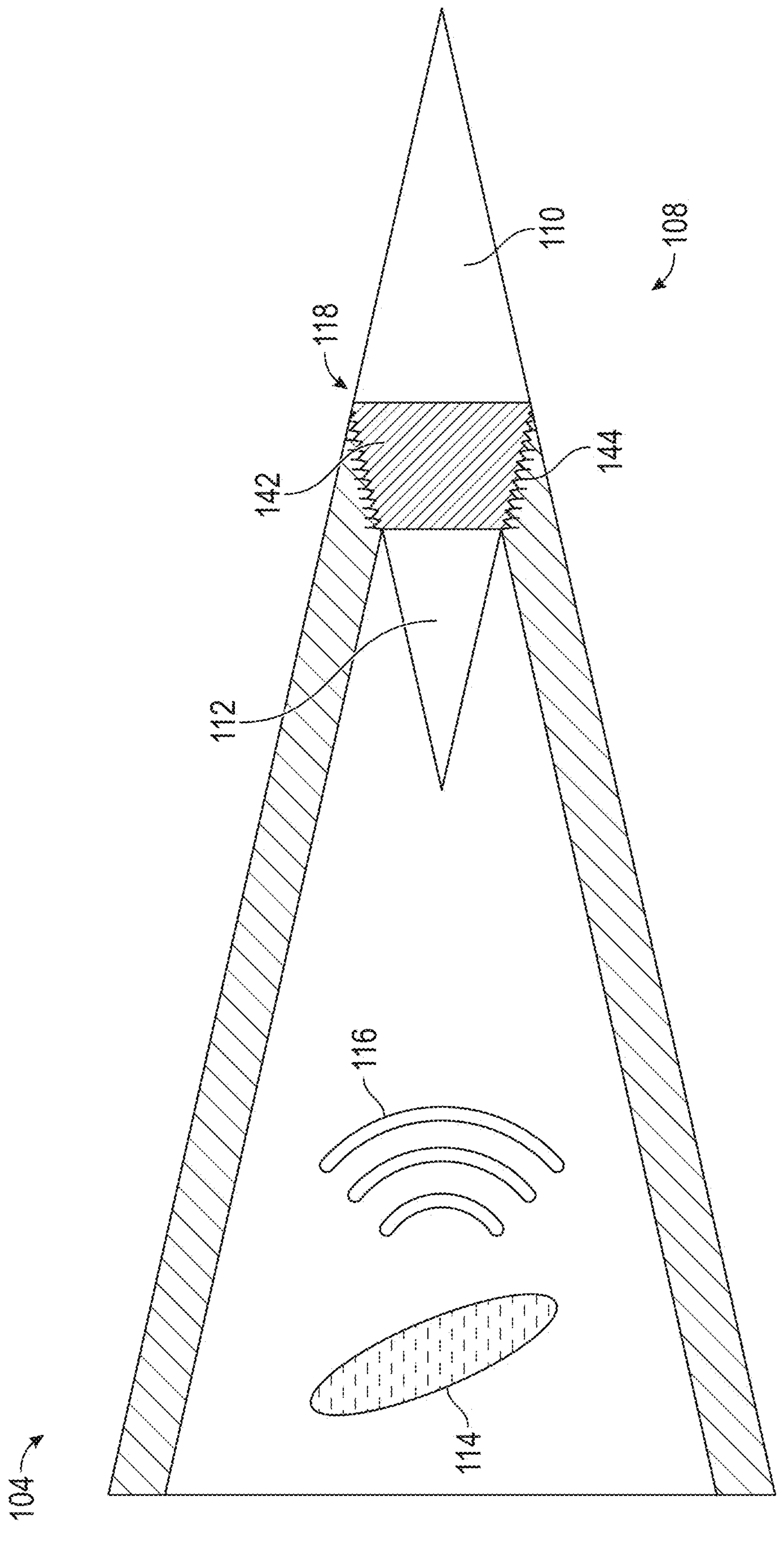
FIG. 3 illustrates an exemplary radome assembly comprising a radome tip in accordance with embodiments disclosed herein.

FIG. 3 illustrates an exemplary radome assembly comprising a radome tip 108 in accordance with embodiments disclosed herein. In some embodiments, radome tip 108 may be mechanically coupled to radome body 106 by engaging an interface portion of radome body 106 (e.g., a first interface portion) with an interface portion of front portion 110 and/or rear portion 112 (e.g., a second interface portion). The engagement of the interface portion of radome body 106 with the interface portion of front portion 110 and/or rear portion 112 may be accomplished using different coupling methods. In some embodiments, the interface portion of radome body 106 and the interface portion of front portion 110 and/or rear portion 112 may be engaged via a threaded coupling for coupling radome tip 108 to radome body 106. For example, radome tip 108 may comprise a threaded portion 142 formed on either rear portion 112 or front portion 110. Threaded portion 142 may be partially or entirely formed on an internal or external surface of front portion 110 or rear portion 112. Threaded portion 142 may be configured to engage with a corresponding threaded interface portion 144 formed on radome body 106, allowing the radome tip 108 to be secured via a threaded coupling. In some embodiments, threaded interface portion 144 may be located partially or entirely within an inner surface of radome body 106. In some embodiments, threaded interface portion 144 may be located partially or entirely on an external surface of radome body 106. For example, threaded interface portion 144 may be adjacent to or formed on a surface of opening 118.

In some embodiments, the operational use of threaded portion 142 may have a negligible impact on the EM transparency or structural performance of radome tip 108. To further enhance mechanical integrity, an adhesive or bonding agent, such as an epoxy, may be applied at the threaded interface portion 144 or other interface (e.g., an interface portion of radome body 106, front portion 110, and/or rear portion 112) between radome body 106 and radome tip 108. The adhesive or bonding agent may provide additional resilience against mechanical and environmental stresses, such as vibration or thermal cycling.

It should be appreciated that the coupling of radome tip 108 to radome body 106 is not limited to a threaded or rotational coupling as described above. In some embodiments, radome tip 108 may be coupled using alternative coupling techniques known in the art, including but not limited to adhesive bonding, press-fitting, snap-fit interfaces, mechanical fasteners, interference fits, thermal welding, or chemical welding.

Figure 4:
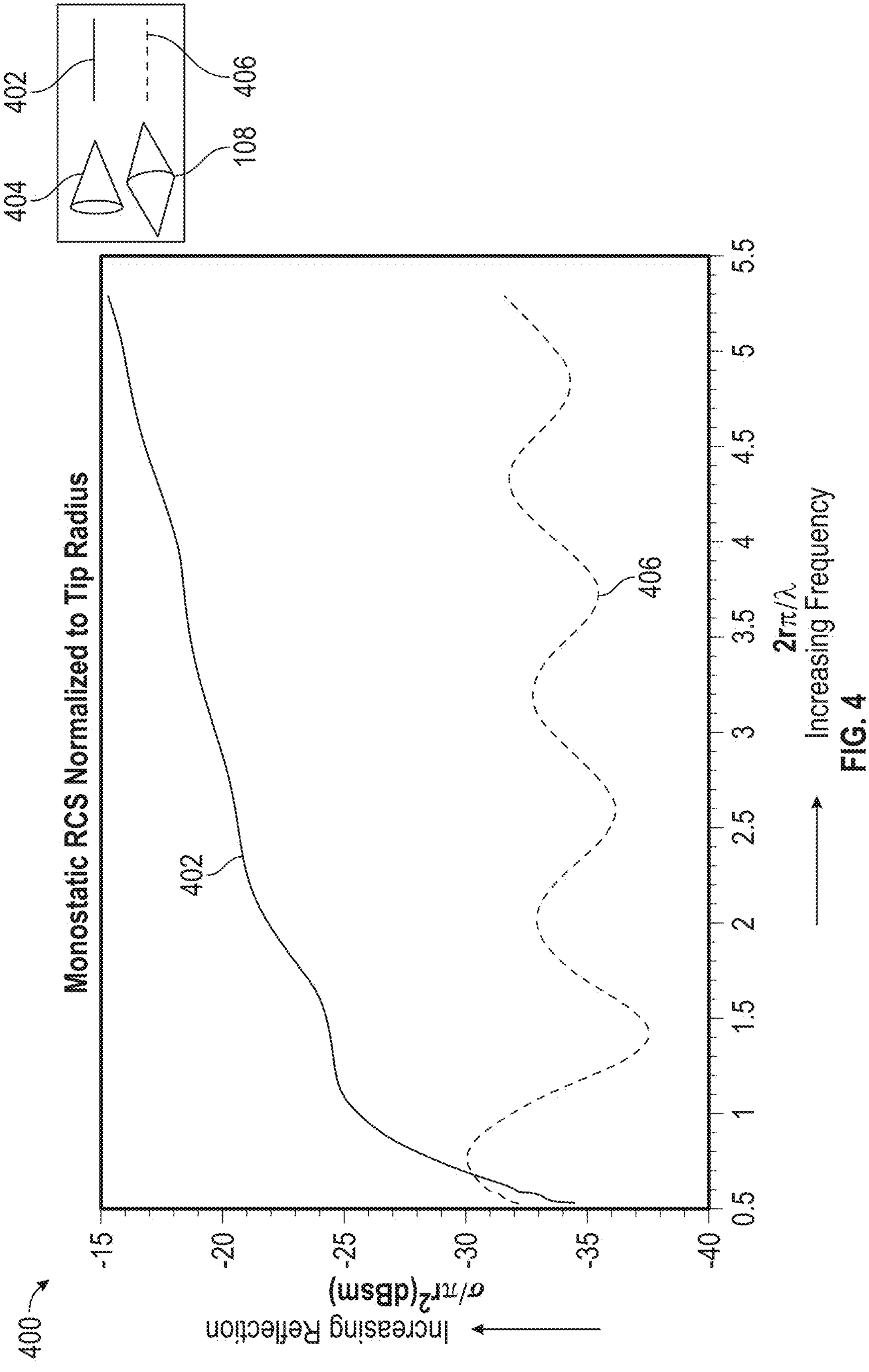
FIG. 4 illustrates a graphical depiction of a monostatic radar cross-section normalized to tip radius as a function of frequency in accordance with embodiments disclosed herein.

FIG. 4 illustrates a graphical representation 400 of monostatic radar cross-section (RCS) normalized to tip radius as a function of frequency in accordance with embodiments disclosed herein. The results depicted in graphical representation 400 are based on monostatic RCS simulations, which estimate the proportion of transmitted energy reflected directly back toward the source (e.g., antenna 114), providing a meaningful metric for real-world antenna performance in radar-guided or communication-sensitive systems. The vertical axis of graphical representation 400 represents reflected power in dBsm (decibels relative to one square meter), and the horizontal axis of graphical representation 400 represents the signal frequency or wavelength relative to a given fixed tip radius of a radome tip.

Two response curves are shown in graphical representation 400: a first response curve 402 corresponding to a traditional flat-back tip design 404 and a second response curve 406 corresponding to an axially symmetric radome tip 108 described herein. As shown, radome tip 108 exhibits substantially reduced back-reflection of signals at both low and high frequencies. Thus, according to the monostatic RCS simulation results depicted in graphical representation 400, radome tip 108 with an axially symmetric geometry about vertical axis 122, as described above, can reflect approximately 2 to 100 times less EM energy toward antenna 114 compared to the traditional flat-back tip design 404. This reduction in backscatter improves the EM transparency of radome assembly 104 and enhances the effective range and signal clarity of antenna 114. Furthermore, the magnitude of reduced reflection is not necessarily limited to the factor range of 2 to 100 illustrated in graphical representation 400 and may be of even greater magnitude depending on operational parameters and design specifics of radome assembly 104 disclosed herein.

Figure 5:
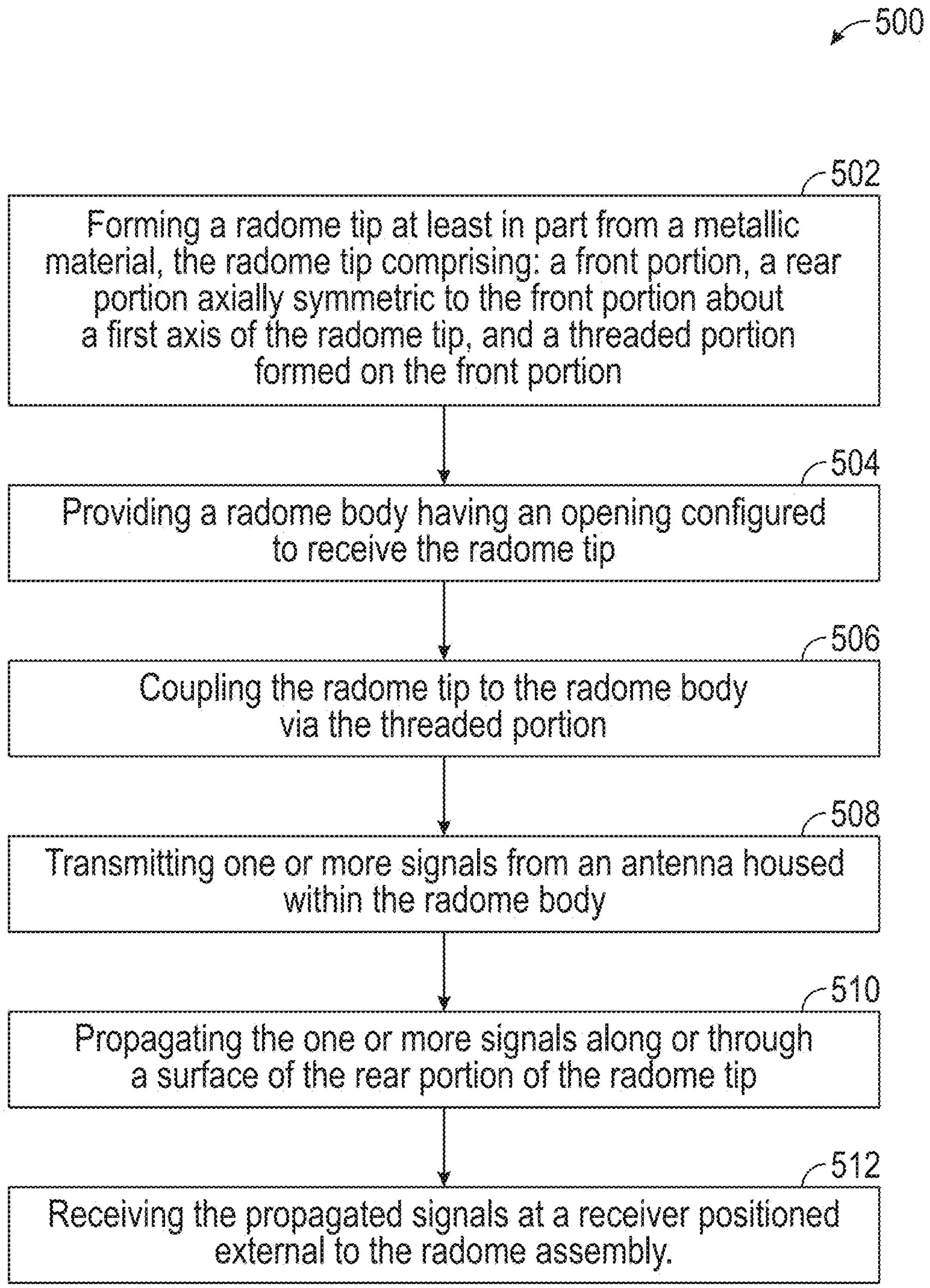
FIG. 5 illustrates an exemplary method of forming a radome assembly in accordance with embodiments disclosed herein.

FIG. 5 illustrates an exemplary method 500 of forming a radome assembly in accordance with embodiments disclosed herein. Having described radome assembly 104 and its adjacent and internal components with reference to FIGS. 1-4 above, method 500 illustrates an exemplary method of forming radome assembly 104. Method 500 may be performed using, but not limited to, some or all the components and features of radome assembly 104 discussed above in reference to FIGS. 1-4. Further, method 500 may be performed using any number of the steps disclosed below and in any order.

At step 502, method 500 includes forming a radome tip, at least in part from a metallic material, the radome tip comprising a front portion, a rear portion axially symmetric to the front portion about a first axis of the radome tip, and a threaded portion formed on the rear portion or the front portion. In some embodiments, the radome tip is not axially symmetric. In some embodiments, the radome tip may be partially or entirely made of a metallic material. In some embodiments, the radome tip may be partially or entirely made of a ceramic material. In some embodiments, the first axis may be a vertical axis of the radome tip.

At step 504, method 500 further includes providing a radome body having an opening configured to receive the radome tip.

At step 506, method 500 further includes coupling the radome tip to the radome body via the threaded portion, allowing for mechanical integration and structural continuity. For example, the threaded portion may be configured to engage with a threaded interface portion of the radome body to couple the radome tip to the radome body.

At step 508, method 500 further includes transmitting one or more signals from an antenna housed within the radome body.

At step 510, method 500 further includes propagating the one or more signals along or through a surface of the rear portion of the radome tip, which may be shaped to facilitate controlled signal redirection or minimal reflection of the propagating signals.

At step 512, method 500 further includes receiving the propagating signals at a receiver positioned external to the radome assembly, such as a ground-based radar station, satellite terminal, or other communication endpoint. In some embodiments, method 500 may be applied in various aerospace or land-based systems where directional signal transmission is desirable.

The following embodiments represent exemplary embodiments of concepts contemplated herein. Any one of the following embodiments may be combined in a multiple dependent manner to depend from one or more other clauses. Further, any combination of dependent embodiments (e.g., clauses that explicitly depend from a previous clause) may be combined while staying within the scope of aspects contemplated herein. The following clauses are exemplary in nature and are not limiting.

Clause 1. A radome assembly, comprising: a radome body.

Clause 2. The radome assembly of clause 1, wherein the radome body comprises an opening.

Clause 3. The radome assembly of any of clauses 1 through 2, wherein the radome body further comprises a threaded interface portion.

Clause 4. The radome assembly of any of clauses 1 through 3, further comprising a radome tip.

Clause 5. The radome assembly of any of clauses 1 through 4, wherein the radome tip is formed at least in part from a metallic material.

Clause 6. The radome assembly of any of clauses 1 through 5, wherein the radome tip is coupled to the opening of the radome body.

Clause 7. The radome assembly of any of clauses 1 through 6, wherein the radome tip comprises a front portion.

Clause 8. The radome assembly of any of clauses 1 through 7, wherein the radome tip comprises a rear portion.

Clause 9. The radome assembly of any of clauses 1 through 8, wherein the rear portion is axially symmetric with the front portion about a vertical axis of the radome tip.

Clause 10. The radome assembly of any of clauses 1 through 9, wherein the radome tip further comprises a threaded portion.

Clause 11. The radome assembly of any of clauses 1 through 10, wherein the threaded portion is formed on the rear portion.

Clause 12. The radome assembly of any of clauses 1 through 11, wherein the threaded portion is configured to engage with the threaded interface portion of the radome body to couple the radome tip to the radome body.

Clause 13. The radome assembly of any of clauses 1 through 12, wherein the rear portion comprises a conical surface.

Clause 14. The radome assembly of any of clauses 1 through 13, wherein the rear portion comprises a first apex angle.

Clause 15. The radome assembly of any of clauses 1 through 14, wherein the rear portion comprises a curved surface.

Clause 16. The radome assembly of any of clauses 1 through 15, wherein the rear portion is a backward protrusion extending into an interior volume of the radome body.

Clause 17. The radome assembly of any of clauses 1 through 16, wherein the radome body houses an antenna disposed within an interior volume of the radome body.

Clause 18. The radome assembly of any of clauses 1 through 17, wherein the antenna is oriented to direct one or more transmitted signals toward a surface of the rear portion.

Clause 19. The radome assembly of any of clauses 1 through 18, wherein the one or more transmitted signals propagate along the surface of the rear portion.

Clause 20. The radome assembly of any of clauses 1 through 19, wherein the radome assembly is coupled to an aerodynamic body.

Clause 21. The radome assembly of any of clauses 1 through 20, wherein the first apex angle is between 10 degrees and 120 degrees relative to a horizontal axis of the radome tip.

Clause 22. The radome assembly of any of clauses 1 through 21, wherein the first apex angle is between 30 degrees and 90 degrees relative to the horizontal axis of the radome tip.

Clause 23. The radome assembly of any of clauses 1 through 22, wherein the first apex angle is between 5 degrees and 45 degrees relative to the horizontal axis of the radome tip.

Clause 24. The radome assembly of any of clauses 1 through 23, wherein the front portion of the radome tip comprises a second conical surface.

Clause 25. The radome assembly of any of clauses 1 through 24, wherein the second conical surface of the front portion has a second apex angle relative to the horizontal axis that is different from the first apex angle of the conical surface of the rear portion.

Clause 26. The radome assembly of any of clauses 1 through 25, wherein the antenna is configured to transmit the one or more signals along a boresight axis of the antenna.

Clause 27. The radome assembly of any of clauses 1 through 26, wherein the boresight axis is substantially aligned with the horizontal axis of the radome tip.

Clause 28. The radome assembly of any of clauses 1 through 27, wherein the radome assembly is coupled to at least one of a missile body or an aircraft body.

Clause 29. The radome assembly of any of clauses 1 through 28, wherein the rear portion and/or the front portion is substantially conical.

Clause 30. The radome assembly of any of clauses 1 through 29, wherein the rear portion is at least partially located within the radome body, wherein the rear portion is shaped to reduce scattering of electromagnetic waves propagating along the radome tip.

Although the present disclosure has been described with reference to the embodiments illustrated in the attached drawing figures, it is noted that equivalents may be employed and substitutions made herein without departing from the scope of the present disclosure as recited in the claims.

Having thus described various embodiments of the present disclosure, what is claimed as new and desired to be protected by Letters Patent includes the following:

1. A radome assembly, comprising:
- a radome body, comprising:
  - an opening; and
  - a first interface portion; and
- a radome tip formed at least in part from a metallic material and coupled to the opening of the radome body, the radome tip comprising:
  - a front portion;
  - a rear portion at least partially located within the radome body, wherein the rear portion is shaped to reduce scattering of electromagnetic waves propagating along the radome tip; and
  - a second interface portion formed on the rear portion,
- wherein the first interface portion and the second interface portion are configured to engage with each other to couple the radome tip to the radome body.

2. The radome assembly of claim 1, wherein the rear portion comprises a conical surface.

3. The radome assembly of claim 2, wherein the conical surface comprises a first apex angle between 5 degrees and 45 degrees relative to a horizontal axis of the radome tip.

4. The radome assembly of claim 1, wherein the rear portion comprises a curved surface.

5. The radome assembly of claim 1, wherein the first interface portion and the second interface portion are configured to engage with each other via a threaded coupling.

6. The radome assembly of claim 1, wherein the radome body houses an antenna disposed within an interior volume of the radome body.

7. The radome assembly of claim 6, wherein the antenna is oriented to direct the electromagnetic waves toward a surface of the rear portion.

8. The radome assembly of claim 1, wherein the rear portion is axially symmetric with the front portion about a vertical axis of the radome tip.

9. An aerodynamic vehicle, comprising:
- an aerodynamic body; and
- a radome assembly coupled to the aerodynamic body, the radome assembly comprising:
  - a radome body housing an antenna, the radome body comprising:
    - an opening; and
    - a first interface portion; and
  - a radome tip formed at least in part from a metallic material and coupled to the radome body, the radome tip comprising:
    - a substantially conical front portion;
    - a substantially conical rear portion at least partially located within the radome body and shaped to reduce scattering of electromagnetic waves propagating along the radome tip; and
    - a second interface portion formed on the substantially conical rear portion,
  - wherein the first interface portion and the second interface portion are configured to engage with each other to couple the radome tip to the radome body,
  - wherein the antenna is configured to transmit the electromagnetic waves that propagate along a surface of the substantially conical rear portion of the radome tip.

10. The aerodynamic vehicle of claim 9, wherein the substantially conical rear portion comprises a first apex angle between 10 degrees and 120 degrees relative to a horizontal axis of the radome tip.

11. The aerodynamic vehicle of claim 10, wherein the first apex angle is between 30 degrees and 90 degrees relative to the horizontal axis.

12. The aerodynamic vehicle of claim 11, wherein the radome tip is at least partially made from a ceramic material.

13. The aerodynamic vehicle of claim 9, wherein the substantially conical front portion has a second apex angle relative to a horizontal axis of the radome tip that is different from a first apex angle of the substantially conical rear portion.

14. The aerodynamic vehicle of claim 9, wherein the substantially conical rear portion is axially symmetric with the substantially conical front portion about a vertical axis of the radome tip.

15. A method of forming a radome assembly, comprising:

providing a radome body, comprising:

an opening; and a first interface portion;

forming a radome tip at least in part from a metallic material and configured to be received by the opening of the radome body, the radome tip comprising:

a front portion;

a rear portion at least partially located within the radome body, wherein the rear portion is shaped to reduce scattering of electromagnetic waves propagating along the radome tip; and a second interface portion formed on the rear portion; and coupling the radome tip to the radome body via engagement of the first interface portion and the second interface portion.

16. The method of claim 15, further comprising:

coupling the radome assembly to at least one of a missile body or an aircraft body.

17. The method of claim 15, wherein the radome tip is coupled to the radome body via a threaded portion formed on the rear portion of the radome tip, the threaded portion being configured to engage with a corresponding threaded interface portion of the radome body.

18. The method of claim 15, wherein the rear portion comprises a conical surface.

19. The method of claim 15, further comprising:

transmitting the electromagnetic waves from an antenna housed within the radome body.

20. The method of claim 15, wherein the rear portion of the radome tip is axially symmetric to the front portion about a first axis of the radome tip.

* * * * *